United States Patent
Baker et al.

(10) Patent No.: US 9,926,079 B2
(45) Date of Patent: Mar. 27, 2018

(54) SPRING LOADED SEAT BOTTOM WHICH LOCKS DURING TAXI, TAKE-OFF AND LANDING

(71) Applicant: B/E Aerospace, Inc., Wellington, FL (US)

(72) Inventors: Cameron Baker, London (GB); Martin Darbyshire, London (GB)

(73) Assignee: B/E AEROSPACE, INC., Wellington, FL (US)

( * ) Notice: Subject to any disclaimer, the term of this patent is extended or adjusted under 35 U.S.C. 154(b) by 133 days.

(21) Appl. No.: 15/073,115

(22) Filed: Mar. 17, 2016

(65) Prior Publication Data
US 2016/0272324 A1    Sep. 22, 2016

Related U.S. Application Data

(60) Provisional application No. 62/134,111, filed on Mar. 17, 2015.

(51) Int. Cl.
*B64D 11/06*    (2006.01)

(52) U.S. Cl.
CPC .................. *B64D 11/064* (2014.12)

(58) Field of Classification Search
CPC .......................... B64D 11/064; B64D 11/0647
See application file for complete search history.

(56) References Cited

U.S. PATENT DOCUMENTS

| | | | | |
|---|---|---|---|---|
| 4,498,703 A * | 2/1985 | Schmidhuber | ......... | B60N 2/231 248/371 |
| 5,283,918 A * | 2/1994 | Weingartner | ............ | A47C 7/20 297/281 |
| 2003/0025371 A1 * | 2/2003 | Veneruso | ............ | B60N 2/0232 297/322 |
| 2005/0046259 A1 * | 3/2005 | Schurg | ................. | B60N 2/0292 297/354.12 |
| 2005/0248193 A1 * | 11/2005 | Dowty | .................. | B64D 11/06 297/248 |
| 2009/0242700 A1 * | 10/2009 | Raymond | ............ | B60N 2/1695 244/118.6 |
| 2010/0308167 A1 * | 12/2010 | Hawkins | ................ | B60N 2/181 244/122 R |
| 2012/0061514 A1 * | 3/2012 | Baumann | ............. | B60N 2/7011 244/122 R |
| 2012/0139302 A1 * | 6/2012 | Estevenin | ............. | B64D 11/06 297/162 |

(Continued)

FOREIGN PATENT DOCUMENTS

| | | |
|---|---|---|
| DE | 10 2012 208721 A2 | 11/2013 |
| WO | 2010/005678 A2 | 1/2010 |
| WO | 2014/115106 A1 | 7/2014 |

OTHER PUBLICATIONS

International Search Report and Written Opinion of corresponding International Application No. PCT/US2016/022898; dated Jun. 10, 2016; 10 pages.

*Primary Examiner* — Timothy J Brindley
(74) *Attorney, Agent, or Firm* — Shumaker, Loop & Kendrick, LLP

(57) ABSTRACT

An aircraft passenger seat having a seat bottom movable between a stationary position for taxi, take-off and landing and a movable position during flight in which at least one of a leading edge and a trailing edge of the seat bottom deflects downward in response to a downward load applied thereto.

16 Claims, 4 Drawing Sheets

(56) References Cited

U.S. PATENT DOCUMENTS

| | | | |
|---|---|---|---|
| 2012/0217779 A1* | 8/2012 | Gaither | B60N 2/242 297/316 |
| 2013/0009435 A1* | 1/2013 | Westerink | B60N 2/1625 297/313 |
| 2013/0127227 A1* | 5/2013 | Oleson | B64D 11/06 297/452.49 |
| 2013/0247303 A1* | 9/2013 | Pozzi | B64D 11/06 5/653 |
| 2014/0175849 A1* | 6/2014 | Berti | B64D 11/06 297/340 |
| 2014/0300145 A1* | 10/2014 | Beroth | B64D 11/06 297/83 |
| 2014/0300161 A1* | 10/2014 | Beroth | B64D 11/06 297/340 |
| 2014/0300171 A1* | 10/2014 | Velasco | B64D 11/06 297/452.18 |
| 2015/0151840 A1* | 6/2015 | Thomaschewski | B60N 2/4221 297/216.19 |
| 2015/0367943 A1* | 12/2015 | Saada | B60N 2/4228 297/216.13 |
| 2016/0023765 A1* | 1/2016 | Zheng | B64D 11/0619 297/342 |
| 2016/0083095 A1* | 3/2016 | Joffre | B64D 11/0693 244/122 B |
| 2016/0297536 A1* | 10/2016 | Velasco | B64D 11/0647 |
| 2017/0021930 A1* | 1/2017 | Henshaw | B64D 11/064 |
| 2017/0073076 A1* | 3/2017 | Ozaki | B64D 11/064 |
| 2017/0174345 A1* | 6/2017 | Murnan | B64D 11/064 |

* cited by examiner

SPRING LOADED SEAT BOTTOM WHICH LOCKS DURING TAXI, TAKE-OFF AND LANDING

CROSS-REFERENCE TO RELATED APPLICATION

This application claims priority from U.S. Application No. 62/134,111 filed Mar. 17, 2015, the entirety of which is incorporated by reference herein.

TECHNICAL FIELD AND BACKGROUND OF THE INVENTION

The present invention relates generally to an airliner passenger seat design, and more particularly, to a spring loaded seat bottom movable between a stationary position during taxi, take-off and landing and a freed position during flight where one or more of a leading edge and a trailing edge of the seat bottom can move up and down, deflecting to different levels according to the downward load applied thereto.

The design of the seat bottom, or seat pan, of an economy class airliner seat is heavily governed by the requirement to pass a series of dynamic tests that form part of the seat certification process. The structure of the seat has to withstand extremely high loads, limit deflection under load, and do so at the minimum weight. To provide comfort, the seat bottom can be formed of a movable structure that can change position and angle according to the reclined position of the seat back. To further enhance comfort, the seat bottom can be constructed from a flexible diaphragm that is securely fastened to the seat bottom structure and covered with foam cushioning.

Passengers are required to be in an upright sitting position during taxi, take-off and landing (TTOL). During flight the sitting position requirements are relaxed. As such, the seat back of most seats is able to recline to a degree to enhance comfort. In premium class seats, the seat back has a greater range of motion and the seat back and seat bottom can be linked such that reclining the seat back changes the angle and/or position of the seat bottom. In economy class seats, the seat bottom is usually fixed in one position regardless of the reclined position of the seat back.

With either seat type, a fixed sitting position becomes uncomfortable over time. Therefore, what is needed is a seat bottom compatible with a reclining seat back that can be held stationary during TTOL to achieve a fixed, upright sitting position, and released during flight to increase body movement, improve blood flow and enhance cushioning.

BRIEF SUMMARY OF THE INVENTION

It is therefore an object of the invention to provide a seat bottom assembly for an economy class passenger seat for an airliner or other conveyance.

It is another object of the invention to provide a seat bottom that increases body movement and improves blood flow during flight or travel.

It is yet another object of the invention to provide a seat bottom movable between a stationary position and a movable position, independent of seat back recline.

It is yet another object of the invention to provide a seat bottom configured to deflect in response to a downward load applied thereto and recover upon removal of the downward load.

It is yet another object of the invention to provide a seat bottom which satisfies upright sitting position requirements for TTOL and is movable during flight to enhance comfort.

To achieve the foregoing and other objects and advantages, in one embodiment the present invention provides an aircraft passenger seat having a seat bottom movable between a stationary position for taxi, take-off and landing and a movable position during flight in which at least one of a leading edge and a trailing edge of the seat bottom deflects downward in response to a downward load applied thereto.

In a further aspect, the seat bottom can include a seat bottom frame positioned between spaced spreaders.

In a further aspect, the seat bottom frame can include spaced frame members, a front beam, a near front beam, and a rear beam interconnecting the spaced frame members, and a flexible diaphragm spanning the front beam, the near front beam and the rear beam.

In a further aspect, the flexible diaphragm can be held in a tensioned state, and wherein the rear beam and the near front beam are spaced apart to allow the flexible diaphragm to deflect downward therebetween and the front beam and the near front beam are positioned close together to prevent the flexible diaphragm from deflecting near a front of the seat bottom frame.

In a further aspect, each of the spaced frame members can be curved or angled.

In a further aspect, the seat can further include a linkage and spring assembly packaged on an inboard side of each of the spreaders, the linkage and spring assembly including a hinge block attached to the inboard side of one of the spreaders, a link pivotably attached at one end to the hinge block, and a spring disposed between a free end of the link and a spring seat defined in the spreader, the spring arranged to bias the link upward in a direction of the seat bottom.

In a further aspect, the spring can be a vertically-oriented helical spring.

In a further aspect, the seat bottom frame can include a vertically-oriented roller rotatably carried on each of the frame members, the vertically-oriented rollers arranged to travel along a top of the links as the seat bottom moves horizontally between the stationary position and the movable position.

In a further aspect, in the stationary position the vertically-oriented rollers can be positioned vertically above the hinge blocks such that the downward load does not act on the links, and in the movable position the vertically-oriented rollers can travel forward along the top of the links causing the free end of the links to pivot downward in response to the downward load.

In a further aspect, the link can define a linear portion along which the vertically-oriented roller travels and the free end of the link can be shaped to capture the spring between a bottom of the link and the spring seat.

According to another embodiment, the present invention provides an aircraft passenger seat having a seat bottom configured to translate between a first position in which the seat bottom is stationary and a second position in which at least one of a leading edge and a trailing edge of the seat bottom moves downward in response to a downward load applied thereto and recovers upward upon removal of the downward load.

In a further aspect, the aircraft passenger seat can have a reclining seat back and spaced spreaders, and the seat bottom can have a seat bottom frame positioned between the spaced spreaders.

In a further aspect, the seat bottom frame can include spaced left and right frame members, a front beam, a near front beam, and a rear beam interconnecting the spaced left and right frame members, and a flexible diaphragm spanning the front beam, the near front beam and the rear beam.

In a further aspect, the seat can include a linkage and spring assembly packaged on an inboard side of at least one of the spreaders, the linkage and spring assembly including a hinge block attached to the inboard side of one of the spreaders, a link pivotably attached at one end to the hinge block, and a biasing member disposed between a free end of the link and a biasing member seat defined in the spreader, the biasing member arranged to bias the link upward in a direction of the seat bottom.

In a further aspect, the biasing member is a vertically-oriented helical spring.

In a further aspect, the seat bottom frame can include a vertically-oriented roller rotatably carried on one of the frame members, the vertically-oriented roller arranged to travel along a top of the link as the seat bottom translates between the first position and the second position, the first position for use during aircraft taxi, take-off and landing and the second position for use during flight.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

Features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
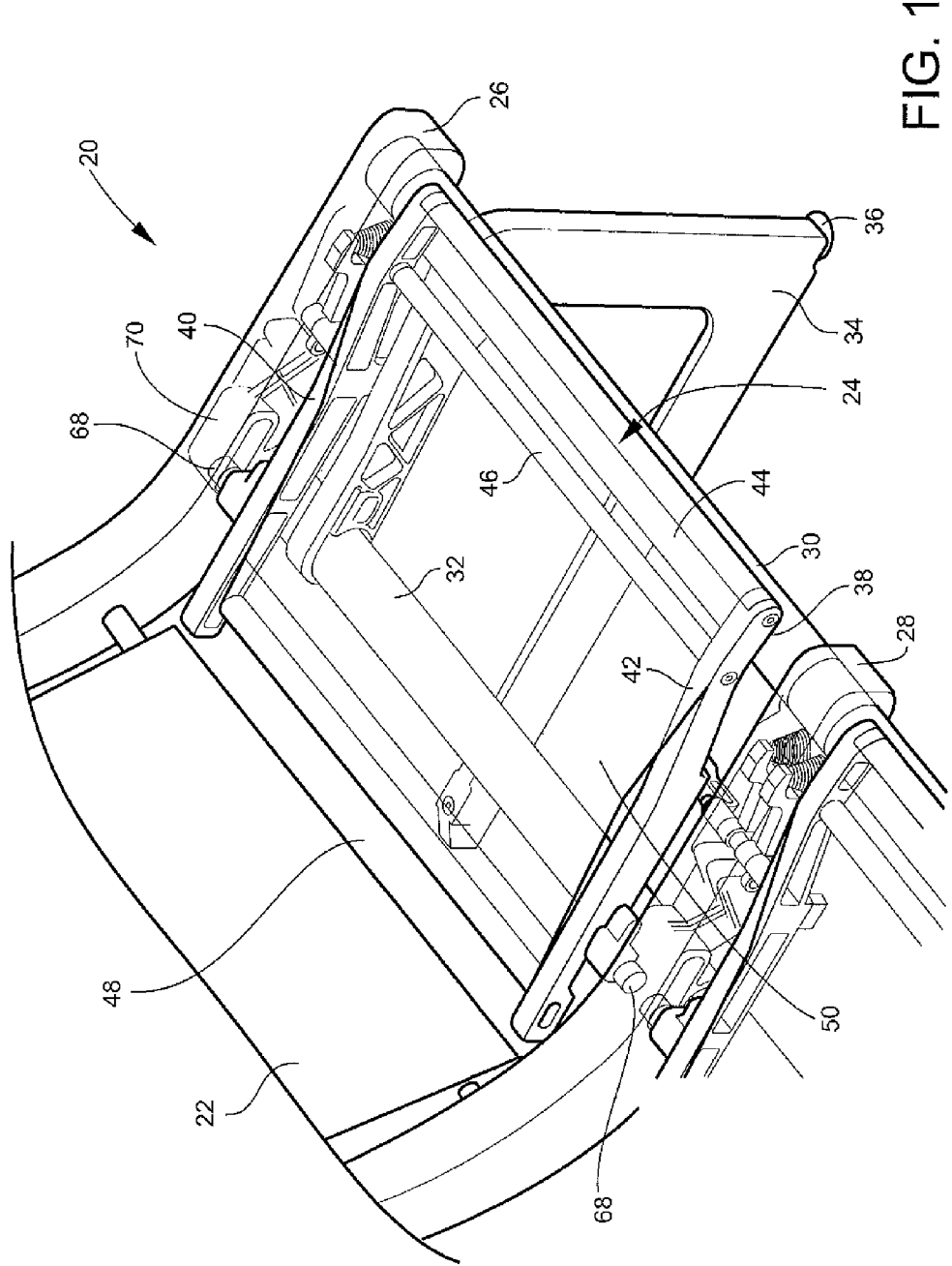
FIG. 1 is a perspective view of a spring loaded seat bottom according to the present invention shown with the cushion removed.

FIG. 1 shows the relevant portions of an aircraft or airliner passenger seat 20 necessary for a complete understanding of the present invention. The seat 20 is shown with the cushion and upholstery removed for clarity. Passenger seat 20 generally includes a recline-capable seat back 22 and sprung seat bottom 24 or seat pan. The seat back 22 and seat bottom 24 can be linked such that motion of one drives motion of the other. The seat bottom 24 is generally positioned and supported between spaced left and right spreaders 26, 28 in an arrangement such that the seat bottom 24 can move or translate horizontally and/or change in pitch.

Front and rear transverse beam tubes 30, 32 are received through and support the spreaders 26, 28 in a generally horizontal position above the floor. The beam tubes 30, 32 further engage through one or more legs 34 equipped with track fasteners 36 for attaching the legs 34 to the floor. The spreaders 26, 28 generally support the seat bottom 24 and may further extend upward to support and/or guide the seat back 22. The beam tubes 30, 32 and legs 34 may be shared by and cooperate to support a row of two, three, four, n-number of laterally adjacent seats. Laterally adjacent seats in the same row may share a single spreader positioned therebetween, or may each include their own dedicated left and right spreaders.

The seat bottom 24 is positioned between the left and right spreaders 26, 28. The seat bottom generally includes a seat bottom frame 38 having left and right frame members 40, 42 oriented longitudinally relative to the seat axis and positioned inward of the respective left and right spreaders 26, 28. The left and right frame members 40, 42 are interconnected through a plurality of transverse beams, such as a front beam 44, near front beam 46, and rear beam 48 as shown. The frame members 40, 42 may be shaped to provide a specific curvature/angular shape to the seat bottom 24, while the beams 44, 46, 48 are positioned and spaced according to the frame member shape. As shown, the rear beam 48 and near front beam 46 are spaced far enough apart to allow the flexible diaphragm 50 to deflect downward therebetween under an applied load from a passenger, while the front beam 44 and near front beam 46 are positioned close together to prevent the flexible diaphragm 50 from deflecting near the front of the seat pan. The flexible diaphragm 50 may attach to the front and rear beams 44, 48 to maintain the diaphragm in a tensioned state. Although removed for clarity, the flexible diaphragm 50 may be covered with a foam cushion and upholstery for comfort and aesthetics.

Figure 2:
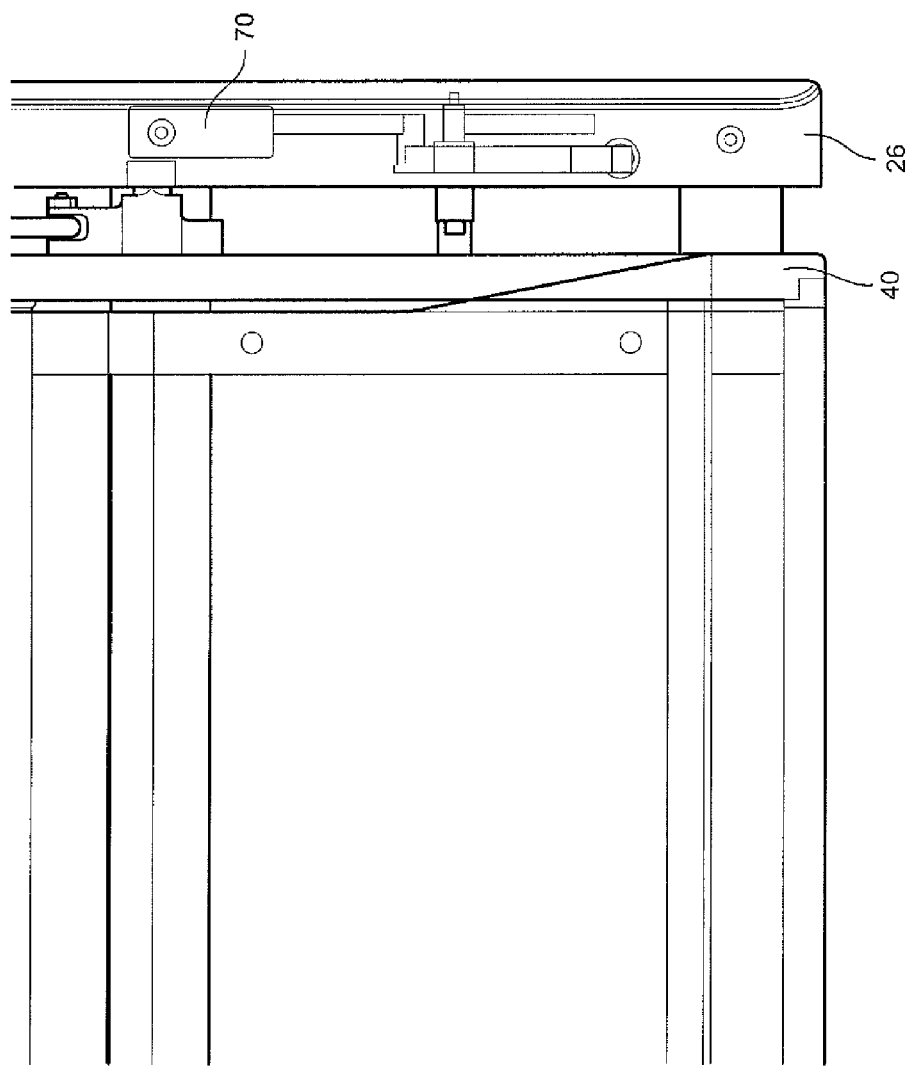
FIG. 2 is a plan view of the seat bottom shown with the cushion removed.
Figure 3:
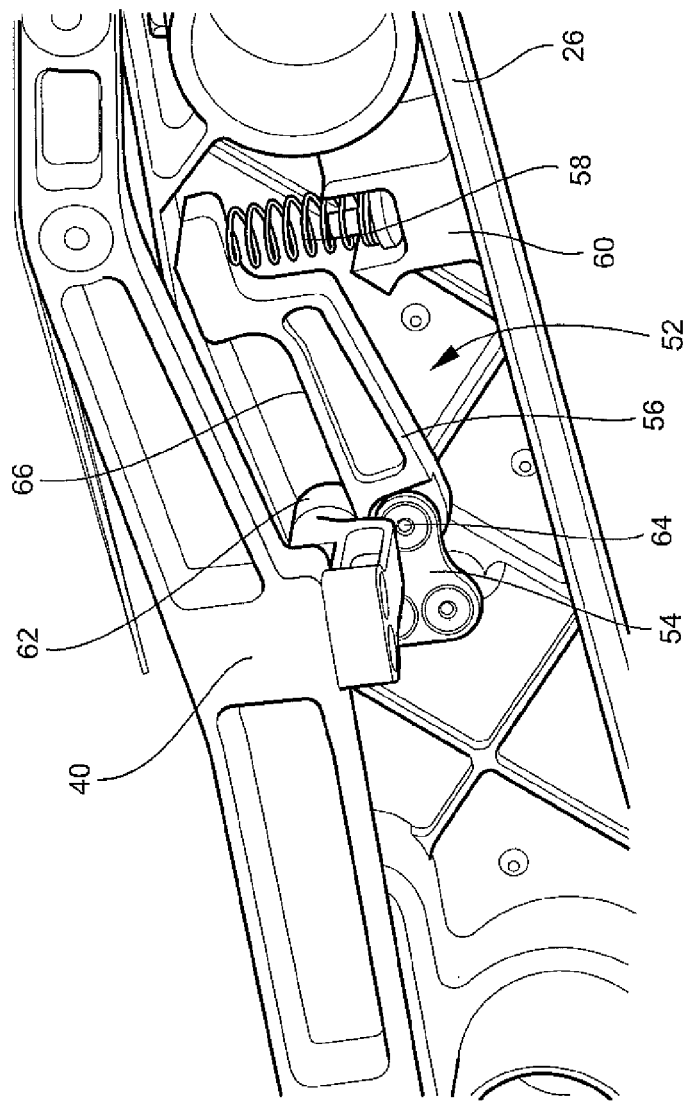
FIG. 3 is a detailed view of the linkage and roller showing the seat bottom locked in the TTOL position.
Figure 4:
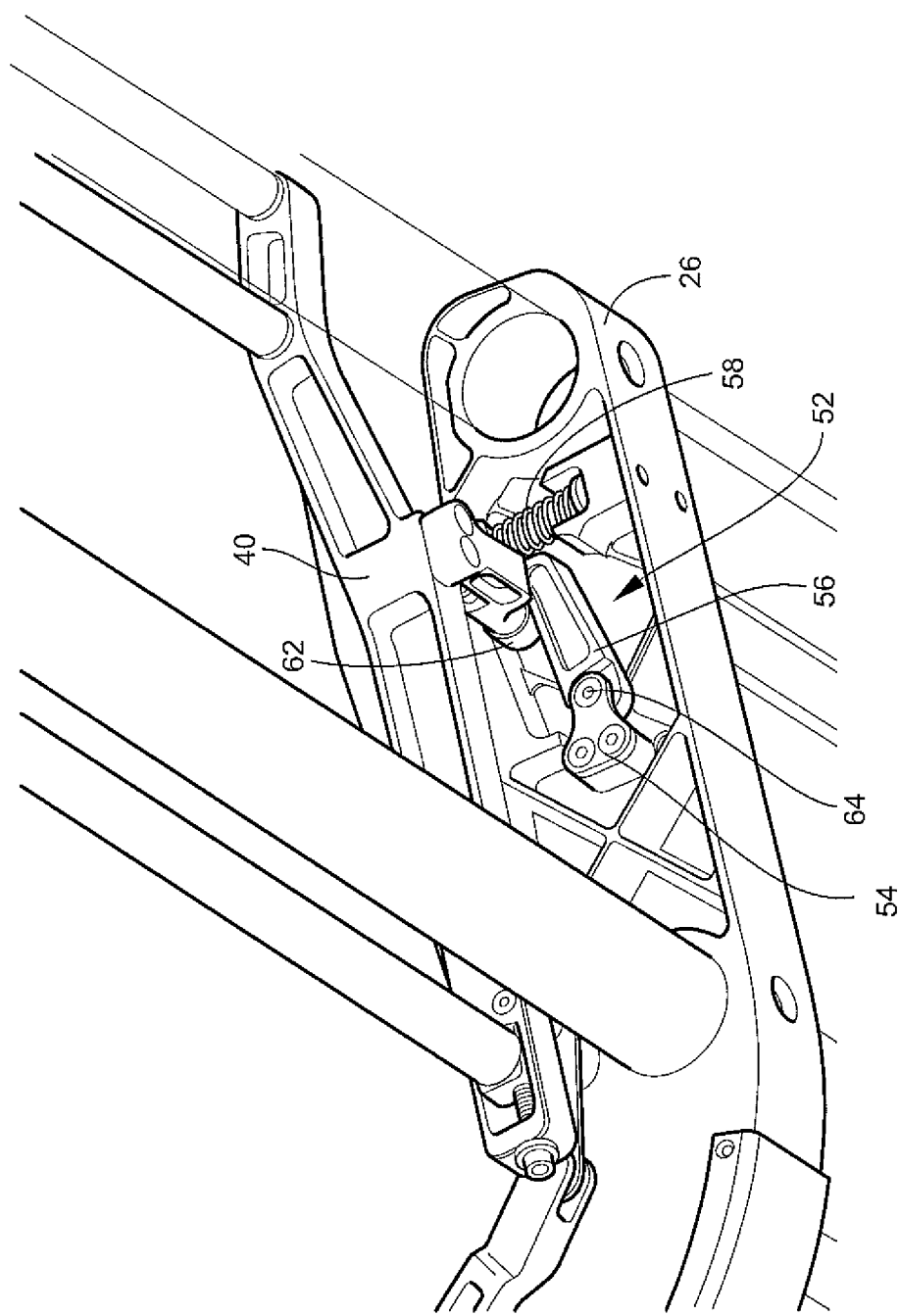
FIG. 4 is a detailed view of the linkage and roller showing the seat bottom freed from the TTOL position.

FIGS. 2-4 show the linkage and spring assembly 52 by which the seat bottom 24 moves between the stationary position and the movable position, and by which the seat bottom 24 is able to deflect, when in the movable position, downward under loading and then recover in the absence or lessening of loading. The seat bottom 24 is configured to move between a first position in which the seat bottom 24 is rearward and stationary or "locked" relative to the spreaders 26, 28 for TTOL, and a second position moved forward relative to, or freed from, the TTOL position. In the first or TTOL position shown in FIG. 3, the seat bottom is stationary such that the leading edge thereof is incapable of deflecting or moving up and down. In the second or freed position shown in FIG. 4, the leading edge of the seat bottom is able to deflect up and down according to the downward load on the seat bottom.

While the drawings show the linkage and spring assembly 52 arranged to bias the leading edge of the seat bottom 24, it is envisioned that the same linkage and spring assembly 52 can be arranged to bias the trailing edge of the seat bottom 24 by relocating the linkage and spring assembly 52 closer to the trailing edge. Two linkage and spring assemblies 52 can also be positioned to bias both the leading and trailing edges of the seat bottom 24, and can be used to tune the amount of deflection of each edge by changing the position of the assemblies 52 and/or front and back spring rates.

Seat bottom locking and deflection is achieved using the compact linkage and spring assembly 52 packaged on the inboard side of each of the left and right spreaders 26, 28. Each linkage and spring assembly 52 generally includes a hinge block 54 attached to the inboard side of the spreader, a link 56 pivotally attached at one end to the hinge block 54, and a biasing member, for example a vertically-oriented helical spring 58, maintained between the free end of the link 56 and a spring seat 60 on the spreader 26. The spring 58 is arranged to bias the link 56 upward in the direction of the seat bottom, and spring force can be adjusted/customized based on the stiffness of the spring used.

The linkage is sprung such that, in use, a vertically-oriented roller 62 rotatably carried on the seat bottom frame member 40 travels along a top surface of the link 56 as the seat bottom 24 moves between the first and second positions. In the first or TTOL position shown in FIG. 3, the roller 62 is positioned vertically above the link pivot point 64, or just behind the link pivot point, such that the roller 62 is positioned vertically above the fixed hinge block 54 such that no downward load acts on the link 56.

In the second position shown in FIG. 4, in which the seat bottom 24 is freed, as the seat bottom moves horizontally forward the roller 62 travels forward along the top surface of the link 56 causing the free end of the link 56 to pivot downward in response to a downward load on the seat bottom large enough to overcome the spring force of the spring 58. The link 56 defines a linear portion 66 along which the roller 62 travels, and the free end of the link 56 is shaped to capture the spring 58 between the bottom of the link 56 and the spring seat 60. The amount of horizontal travel of the seat pan 24 determines the length of the link 56. The link 56 may also have a predetermined shape and/or orientation to control the seat bottom angle as the seat bottom moves forward and backward.

As best shown in FIGS. 1 and 2, additional vertically-oriented rollers 68 rotatably carried near the back of the frame members 40, 42 travel within elongate guides 70 of the left and right spreaders 26, 28, which guide the trailing edge of the seat bottom as the seat bottom moves between the first and second positions. While the guides 70 shown are linear, they can have any predetermined curvature and/or orientation to control the seat bottom angle as the seat bottom moves. For example, it may be desirable for the seat bottom 24 to be farther from horizontal in the TTOL position and closer to horizontal in the freed position, or vice versa.

The sprung seat bottom described herein increases comfort once the seat bottom has been moved out of, or freed from, the TTOL position. Deflection in the seat bottom increases body movement, improves blood flow and enhances cushioning, among other advantages.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. An aircraft passenger seat, comprising:
   a seat bottom movable between a stationary position for taxi, take-off and landing and a movable position during flight in which at least one of a leading edge and a trailing edge of the seat bottom deflects downward in response to a downward load applied thereto, the seat bottom comprising a seat bottom frame positioned between spaced spreaders; and
   a linkage and spring assembly packaged on an inboard side of each of the spaced spreaders, each linkage and spring assembly comprising:
      a hinge block attached to the inboard side of the respective spreader;
      a link pivotally attached at one end to the hinge block; and
      a spring disposed between a free end of the link and a spring seat defined in the respective spreader, the spring arranged to bias the link upward in a direction of the seat bottom.

2. The aircraft passenger seat of claim 1, wherein the seat bottom frame comprises:
   spaced frame members;
   a front beam, a near front beam, and a rear beam interconnecting the spaced frame members; and
   a flexible diaphragm spanning the front beam, the near front beam and the rear beam.

3. The aircraft passenger seat of claim 2, wherein the flexible diaphragm is held in a tensioned state, and wherein the rear beam and the near front beam are spaced apart to allow the flexible diaphragm to deflect downward therebetween and the front beam and the near front beam are positioned close together to prevent the flexible diaphragm from deflecting near a front of the seat bottom frame.

4. The aircraft passenger seat of claim 2, wherein each of the spaced frame members are curved or angled.

5. The aircraft passenger seat of claim 1, wherein the spring is a vertically-oriented helical spring.

6. The aircraft passenger seat of claim 1, wherein the seat bottom frame further comprises a vertically-oriented roller rotatably carried on each of the frame members, the vertically-oriented rollers arranged to travel along a top of the links as the seat bottom moves horizontally between the stationary position and the movable position.

7. The aircraft passenger seat of claim 6, wherein in the stationary position the vertically-oriented rollers are positioned vertically above the hinge blocks such that the downward load does not act on the links, and in the movable position the vertically-oriented rollers travel forward along the top of the links causing the free end of the links to pivot downward in response to the downward load.

8. The aircraft passenger seat of claim 1, wherein the link defines a linear portion along which the vertically-oriented roller travels and the free end of the link is shaped to capture the spring between a bottom of the link and the spring seat.

9. An aircraft passenger seat, comprising:
   a reclining seat back;
   spaced spreaders;
   a seat bottom comprising a seat bottom frame positioned between the spaced spreaders, the seat bottom configured to translate between a first position in which the seat bottom is stationary and a second position in which at least one of a leading edge and a trailing edge of the seat bottom moves downward in response to a downward load applied thereto and recovers upward upon removal of the downward load; and a linkage and spring assembly packaged on an inboard side of at least one of the spaced spreaders, the linkage and spring assembly comprising:
  a hinge block attached to the inboard side of the respective spreader;
  a link pivotably attached at one end to the hinge block; and
  a biasing member disposed between a free end of the link and a biasing member seat defined in the respective spreader, the biasing member arranged to bias the link upward in a direction of the seat bottom.

10. The aircraft passenger seat of claim 9, wherein the seat bottom frame comprises:
  spaced left and right frame members;
  a front beam, a near front beam, and a rear beam interconnecting the spaced left and right frame members; and
  a flexible diaphragm spanning the front beam, the near front beam and the rear beam.

11. The aircraft passenger seat of claim 10, wherein the flexible diaphragm is held in a tensioned state, and wherein the rear beam and the near front beam are spaced apart to allow the flexible diaphragm to deflect downward therebetween and the front beam and the near front beam are positioned close together to prevent the flexible diaphragm from deflecting near a front of the seat bottom frame.

12. The aircraft passenger seat of claim 10, wherein each of the spaced left and right frame members are curved or angled.

13. The aircraft passenger seat of claim 9, wherein the biasing member is a vertically-oriented helical spring.

14. The aircraft passenger seat of claim 9, wherein the seat bottom frame further comprises a vertically-oriented roller rotatably carried on one of the frame members, the vertically-oriented roller arranged to travel along a top of the link as the seat bottom translates between the first position and the second position, the first position for use during aircraft taxi, take-off and landing and the second position for use during flight.

15. The aircraft passenger seat of claim 14, wherein in the first position the vertically-oriented roller is positioned vertically above the hinge block such that the downward load does not act on the link, and in the second position the vertically-oriented roller travels forward along the top of the link thereby causing the free end of the link to pivot downward in response to the downward load.

16. The aircraft passenger seat of claim 9, wherein the link defines a linear portion along which the vertically-oriented roller travels and the free end of the link is shaped to capture the biasing member between a bottom of the link and the biasing member seat.

* * * * *